United States Patent

[11] 3,625,901

| [72] | Inventors | Larry M. Rue<br>Inver Grove Heights;<br>Dale W. Groth, Bloomington; Alan W.<br>Leipnitz, Burnsville; Thomas E. Brunelle,<br>West St. Paul; Samuel B. Crecelius,<br>Mendota Heights, all of Minn. |
|---|---|---|
| [21] | Appl. No. | 881,614 |
| [22] | Filed | Dec. 2, 1969 |
| [45] | Patented | Dec. 7, 1971 |
| [73] | Assignee | Economics Laboratory, Inc.<br>St. Paul, Minn. |

[54] SURFACE ACTIVE DISHWASHING RINSE AIDS
1 Claim, No Drawings

[52] U.S. Cl. .................................................. 252/89,
252/351, 252/356

[51] Int. Cl. ...................................................... B01f 17/42,
C11d 1/825

[50] Field of Search ............................................. 252/89,
351, 356, 321; 260/97.5

[56] References Cited
UNITED STATES PATENTS

| 3,340,309 | 9/1967 | Weipert......................... | 252/89 X |
| 2,867,585 | 1/1959 | Vitale........................... | 252/89 X |

Primary Examiner—Leon D. Rosdol
Assistant Examiner—Harris A. Pitlick
Attorney—Pendleton, Neuman, Williams & Anderson

ABSTRACT: Surfactants having a combination of foaming, defoaming and sheeting properties desired for use as dishwashing rinse aids which are comprised of condensation products of alkylene oxides with tall oil heads.

of 2 hours, 11 minutes. During this time the heat of reaction raised the temperature from the starting 135° C. to a maximum temperature of 205° C. and cooling was required. The product was cooled and removed from the reactor.

EXAMPLE 3

To a stainless steel pressure reactor were added 167.8 grams (0.5 mole) of tall oil heads having an acid value of 167 and 2.0 grams of crushed potassium hydroxide. Heat was applied to melt the tall oil heads and when liquefied the reactor was sealed and the system flushed with nitrogen gas. Agitation was started and heating continued. When the temperature had reached 110° C., the reaction system was again flushed with nitrogen gas, leaving a residual pressure of 10 p.s.i.g. When the temperature reached 151° C., 440.3 grams (10 moles) of ethylene oxide were added slowly over a period of 1 hour, 48 minutes. During this time the heat of reaction raised the temperature from the starting temperature of 151° C. to a final temperature of 202° C. The product was cooled and removed from the reactor.

EXAMPLE 4

To a stainless steel pressure reactor were added 167.8 grams (0.5 mole) of tall oil heads having an acid value of 167, which had been liquefied by heating, and 2.0 grams of crushed potassium hydroxide. Nitrogen gas was flushed through the system, agitation started and heat applied. When the temperature reached 103° C., the reaction mixture was again flushed with nitrogen gas, leaving a residual pressure, due to nitrogen, of 10 p.s.i.g. When the temperature reached 140° C., 550 grams (12.5 moles) of ethylene oxide were added slowly over a period of 1 hour, 23 minutes. During this time the heat of reaction raised the temperature from the starting temperature of 140° C. to a maximum temperature of 207° C. The product was cooled and removed from the reactor.

EXAMPLE 5

To a stainless steel pressure reactor were added 167.8 grams (0.5 mole) of tall oil heads having an acid value of 167, which had been liquefied by heating, and 2.0 grams of crushed potassium hydroxide. Nitrogen gas was flushed through the system, agitation started and heat applied. When the temperature reached 107° C., the system was again flushed with nitrogen gas, leaving a residual pressure of 10 p.s.i.g. When the temperature reached 122° C., 660.0 grams (15.0 moles) of ethylene oxide were added slowly over a period of 2 hours, 4 minutes. During this time, the heat of reaction raised the temperature from 122° C. to a maximum temperature of 210° C. The product was cooled and removed from the reactor.

EXAMPLE 6

To a stainless steel pressure reactor were added 224 grams (0.5 mole) of tall oil heads having an acid value of 167, which had been liquified by heating, and 2.0 grams of crushed potassium hydroxide. Nitrogen gas was flushed through the reaction system, agitation started and heat applied. At a temperature of 107° C., the reaction system was again purged with nitrogen gas leaving a residual pressure of 8 p.s.i.g. When the temperature reached 156° C., 440 grams (10.0 moles) of ethylene oxide were added slowly over a period of time of 1 hour, 16 minutes. During this time, the heat of reaction raised the temperature from 156° C. to a final temperature of 205° C. The product was cooled and removed from the reactor.

EXAMPLE 7

To a stainless steel pressure reactor were added 224 grams (0.5 mole) of tall oil heads having an acid value of 167, which had been liquefied by heating, and 2.0 grams of crushed potassium hydroxide. The reactor was purged with nitrogen gas, agitation started and hat applied. When the temperature reached 103° C., the reaction system was again purged with nitrogen gas, leaving a residual pressure of 10 p.s.i.g. When a temperature of 130° C. was reached, 660 grams (15 moles) of ethylene oxide were added slowly over a period of time of 2 hours. During this time, the heat of reaction raised the temperature from 130° C. to a maximum temperature of 215° C. The product was cooled and removed from the reactor.

EXAMPLE 8

To a stainless steel pressure reactor were added 871.8 grams (2.408 moles) of tall oil heads having an acid value of 154.8, which had been liquefied by heating, and 8.72 grams of crushed potassium hydroxide. The reactor was purged with nitrogen gas, agitation started and heat applied. When a temperature of 120° C. had been reached, the reaction system was flushed three times with nitrogen gas and vented to 0 p.s.i.g. on the final purge. When a temperature of 146° C. had been reached, 2,119.5 grams (48.17 moles) of ethylene oxide were added slowly over a period of time of 1 hour, 13 minutes. During this time, the heat of reaction raised the temperature from 146° C. to a maximum temperature of 210° C. and cooling was required at times to maintain the temperature at about 190° C. for the majority of the time. The reaction was continued for 20 minutes after completion of the addition of ethylene oxide. The reactor was then cooled and the product removed.

EXAMPLE 9

To a stainless steel pressure reactor were added 208.9 grams (0.644 mole) of tall oil heads having an acid value of 172.9, which had been liquefied by heating, and 2.0 grams of crushed potassium hydroxide. The reactor was purged with nitrogen gas, agitation started and heat applied. When a temperature of 110° C. had been reached the reactor was again purged with nitrogen gas. When a temperature of 155° C. was reached 566 grams (12.86 moles) of ethylene oxide were added slowly over a period of time of 2 hours. During this time, the heat of reaction increased the temperature from 155° to 200° C. Agitation was continued for 50 minutes, the reactor was then cooled and the product removed.

EXAMPLE 10

To a stainless steel pressure reactor were added 1,249 grams (3.45 moles) of tall oil heads having an acid value of 153.7 and 12.5 grams of crushed potassium hydroxide. The reactor was then purged with nitrogen gas, agitation started and heat applied. When the temperature reached 110° C. the reactor was purged three times with nitrogen gas. When a temperature of 130° C. was reached, 3,390 grams (69.0 moles) of ethylene oxide were added slowly over a period of time of 4 hours, 5 minutes. The reactor was cooled and the product removed.

EXAMPLE 11

To a stainless steel pressure reactor were added 871.8 grams (2.44 moles) of tall oil heads having an acid value of 157.1 and 8.72 grams of crushed potassium hydroxide. The reactor was purged with nitrogen gas and heat applied and agitation started. When the temperature reached 110° C., the system was purged three times with nitrogen gas by pressurizing to 40 p.s.i.g. and then venting. At a temperature of 155° C. the addition of 2,119.5 grams (48.17 moles) of ethylene oxide was started. The ethylene oxide was added over a period of 1 hour, 47 minutes. The temperature reached a maximum of 215° C. and for the majority of the time was in the range 185°–190° C. After the addition was complete the reaction was continued until all ethylene oxide had reacted and the product was then cooled and removed from the reactor.

EXAMPLE 12

To a stainless steel pressure reactor were added 371.0 grams (1.0 mole) of tall oil heads having an acid value of 150.9 and 3.71 grams of crushed potassium hydroxide. The

SURFACE ACTIVE DISHWASHING RINSE AIDS

This invention relates to new surface active agents, their preparation and use in rinsing of dishware and eating utensils.

The use of rinse aids in automatic dishwashing equipment, both of the residential and commercial type, is widely practiced. A rinse aid must, of course, exhibit surface activity and in addition should desirably possess good foaming, defoaming, and sheeting properties.

The foaming properties of a detergent relate to the tendency of the detergent itself to produce foam when utilized in a washing operation. A low-foaming detergent is one which will not foam to a degree which will impair wash action. As determined by the known Ross-Miles foam test, a low-foaming detergent is one which provides an initial foam of not more than 45 millimeters in height.

The defoaming properties of a surfactant relate to the ability of the surfactant to control or suppress foaming caused by materials present in the washing operation other than the surfactant itself. A number of soils, notably egg and milk soils, in washing processes, will promote excessive foaming to a point where serious loss in wash pressure and soil removal occurs. The defoaming properties of a surfactant can be conveniently measured under conditions simulating practical field use. Thus, the defoaming test is carried out using a commercial dishwasher machine having a water capacity of 10 liters and a revolving wash arm. The revolutions per minute of the wash arm are a function of the wash pressure, the higher the number of revolutions per minute, the higher the wash pressure. The washer is filled with 10 liters of 150° F. water and the machine operated for 1 minute to allow the machine to attain a uniform temperature. The revolutions per minute of the wash arm are clocked to determine the wash pressure with water alone. A standard (Proceedings of the 43rd Midyear Meeting of the Chemical Specialties Manufacturers Association, p. 165) soil is added in amounts to give a concentration of 0.04 percent by weight and the machine operated for 2 minutes. The revolutions per minute of the wash arm are clocked again to determine the wash pressure in presence of soil. Then 1½ cubic centimeters of surfactant solution is added to the machine and the machine operated for 30 seconds. The revolutions per minute of the wash arm are clocked again to determine the effectiveness of the surfactant in restoring the wash pressure as indicated by wash arm revolutions.

It is therefore a principal object of the present invention to provide novel surface active agents admirably suited for use as rinse additives which have good foaming, defoaming and sheeting characteristics.

The rinse aids of this invention comprise a mixture of surface active products A and B. Product A is prepared by condensation (ethoxylation) of 10 to 30 moles of ethylene oxide with tall oil heads. Condensation of ethylene oxide with tall oil heads is conducted in the presence of an alkaline catalyst such as potassium hydroxide, sodium hydroxide, sodium methoxide, metallic sodium and the like under pressures ranging from about 10 to 60 p.s.i.g. and temperatures of 130° to 250° C., preferably 170° to 200° C. The amount of ethylene oxide employed is of considerable importance and the number of ethoxy units ($C_2H_4O$) incorporated in the product ranges from 10 to 30. When less than 10 moles of ethylene oxide are reacted with the tall oil heads the product is only slightly soluble in water whereas when appreciably more than 30 moles of ethylene oxide are reacted the product exhibits undesirable foaming tendencies. Preparation of product A, which is herein designated tall oil heads ethoxylate, is exemplified in the following examples 1 through 12. These products are pasty waxlike materials at ambient temperatures and brownish in color.

Product B is prepared by the sequential addition of ethylene oxide and propylene oxide to tall oil heads to give a block polymer type of product which can be represented as follows:

PRODUCT B $$Y-(C_2H_4O)_m-(C_3H_6O)_n(C_2H_4O)_x-(C_3H_6O)_y-H$$

wherein Y represents the alkyl residue of acids present in tall oil heads and $m+x$ are integers which together range from 20 to 40 and $n+y$ are integers which together range from 20 to 40.

The ethylene oxide and propylene oxide can be added to the tall oil heads over a period of several hours in the presence of an alkaline catalyst such as referred to above under pressures ranging from about 10 to 60 p.s.i.g. and temperatures of from about 130° to 250° C., preferably 140° to 170° C. The preparation of product B, which is herein designated tall oil heads ethoxylate and propoxylate is exemplified in examples 13 through 17. These products are pasty materials at ambient temperature and brownish in color.

As is known, tall oil is a byproduct of the wood pulp industry usually recovered from fine wood "black liquor" of the sulfate or kraft paper process. The crude tall oil usually contains from about 35 to 40 percent rosin acids, from about 50 to 60 percent fatty acids (predominantly oleic and linoleic) and from about 5 to 10 percent unsaponifiable matter (high molecular weight esters). By distillation procedures refined tall oil acids can be obtained consisting of 90 percent or more of the fatty acids oleic and linoleic. Refined tall oil acids, depending upon extent of refining, have acid values of above 170. As is known in the art, tall oil heads is a fraction obtained by distillation which contains small amounts of rosin acids together with fatty acids and unsaponifiable material. The tall oil heads are characterized as having an acid value not substantially greater than 170, generally about 100 to about 170, and the acid value serves to characterize the tall oil heads. A typical characterization of tall oil heads is as follows:

| | |
|---|---|
| Acid Value | 100–170 |
| Saponification Value | 105–175 |
| Composition | |
| Rosin Acids, % | 0.1–1.0 |
| Unsaponifiables, % | 16–50 |
| Fatty Acids, (Predominantly $C_{14}$–$C_{18}$), % | 50–84 |
| Specific Gravity 25°/25° C. | 0.911–0.920 |

EXAMPLE 1

To a stainless steel pressure reactor were added 167.8 grams (0.5 mole) of tall oil heads having an acid value of 167, which had been liquified by heating, and 1.0 gram of crushed potassium hydroxide. Nitrogen gas was flushed through the system, agitation started and heat applied. When the temperature had reached 110° C., the reaction mixture was again flushed with nitrogen gas by pressurizing to 20 p.s.i.g. and then venting to zero and the precess repeated for three times leaving a residual pressure of 10 p.s.i.g. on the third venting operation. After the reactor was closed, 220.3 grams (5.0 moles) of ethylene oxide were added slowly over a period of approximately 4 hours. During this time the heat of reaction raised the temperature from the starting 115° C. to a final temperature of 207° C. The reaction mixture was left at the residual pressure of 40 p.s.i.g. for an additional 30 minutes to complete the reaction and was then cooled to 95° C. and the product removed from the reactor.

EXAMPLE 2

To a stainless steel pressure reactor were added 167.8 grams (0.5 mole) of tall oil heads having an acid value of 167, which had been liquefied by heating, and 2.0 grams of crushed potassium hydroxide. Nitrogen gas was flushed through the system, agitation started and heat applied. When the temperature had reached 110° C., the reaction mixture was again flushed with nitrogen gas, leaving a residual pressure of 10 p.s.i.g. When the temperature reached 135° C., 330.0 grams (7.5 moles) of ethylene oxide were added slowly over a period reactor was purged with nitrogen gas, heat applied and agitation started. At a temperature of 115° C., the reactor system was purged three times with nitrogen gas by pressurizing to 40 p.s.i.g. and then venting. When the temperature reached 153° C. the addition of 880.0 grams (20 moles) of ethylene oxide was started. The ethylene oxide was added over a period of 1 hour, 5 minutes at a temperature of about 180° to 190° C. After the addition was complete the reaction was continued until all ethylene oxide had reacted and the product was then cooled and removed from the reactor.

started and heat applied. At a temperature of 115° C. the reactor was purged three times with nitrogen gas. When the temperature reached 150° C., the addition of 402.3 grams (9.142 moles) of ethylene oxide was started. The addition of ethylene oxide was complete after 52 minutes at a temperature of 165° to 188° C. The reaction was continued for 8 minutes, and then the addition of 531.2 grams (9.142 moles) of propylene oxide was started. The addition of propylene oxide was completed after 1 hour, 38 minutes at a temperature of 178° to 185° C. When the reaction of propylene oxide was complete the Typical chemical and physical properties of Product A materials of the invention are shown below in Table I.

TABLE I

| Surfactant, product of— | KOH, percent by wt. of acid | Moles ethylene oxide | Cloud point, ° C. | Surface tension 0.1% soln. in distilled water, dynes/cm. | Ross-Miles foam height in mm. | |
|---|---|---|---|---|---|---|
| | | | | | Initial | 5 min. |
| Example: | | | | | | |
| 1 | 0.6 | 10 | (¹) | | | |
| 2 | 1.9 | 15 | ² 90 | 40.3 | 30 | 27 |
| 3 | 1.9 | 20 | ² 90 | 42.5 | 38 | 34 |
| 4 | 1.9 | 25 | ² 90 | 42.5 | 38 | 34 |
| 5 | 1.9 | 30 | ² 90 | 43.6 | 40 | 32 |
| 6 | 0.9 | 20 | ² 90 | 40.7 | 35 | 32 |
| 7 | 0.9 | 30 | ² 90 | 42.4 | 44 | 39 |
| 8 | 1.0 | 20 | ³ 48.0 | 42.2 | 45 | 40 |
| 9 | 1.0 | 20 | | 43.0 | 40 | 35 |
| 10 | 1.0 | 20 | ³ 43.5 | 42.6 | 45 | 40 |
| 11 | 1.0 | 20 | ³ 47.0 | 42.9 | 43 | 38 |
| 12 | 1.0 | 20 | ³ 45.3 | 42.5 | 43 | 38 |

¹ Slightly soluble.
² 1% solution in distilled water.
³ 1% solution in 10% NaCl solution.

The foaming properties of a surfactant relate to the tendency of the surfactant itself to produce foam when utilized in a washing operation. A low-foaming surfactant is one which will not foam to a degree which will impair wash action. As determined by the known Ross-Miles foam test, a low-foaming surfactant is one which provides an initial foam of not more than about 45 mm. in height. While the A products of the present invention fulfill the above requirements, as seen in table I, significantly improved results are achieved by employing product B in conjunction with A products to provide a formulation with exceptional rinse additive characteristics, including desired low-foaming characteristics.

The preparation of the B products of the present invention are illustrated by the following specific examples.

EXAMPLE 13

To a 2-liter stainless steel pressure reactor were added 168.3 grams (0.457 mole) of tall oil heads having an acid value of 152.5 and 1.68 grams of crushed potassium hydroxide. The reactor was purged with nitrogen gas, agitation started and heat applied by means of an electric mantle. When the temperature reached 156° C. the reactor was purged three times with nitrogen gas. When the temperature reached 163° C., the addition of 402.4 grams (9.146 moles) of ethylene oxide was started. The addition of ethylene oxide required 3 hours and 40 minutes with a temperature of about 175° to 185° C. The reaction was continued for 6 minutes and then the addition of 531.4 grams (9.146 moles) of propylene oxide was started. The addition of propylene oxide required 2 hours, 30 minutes at a temperature of about 177° to 185° C. When the reaction of propylene oxide was complete the product was cooled and removed from the reactor.

EXAMPLE 14

To a 2-liter stainless steel pressure reactor were added 168.2 grams (0.457 mole) of tall oil heads having an acid value of 152.5 and 1.68 grams of crushed potassium hydroxide. The reactor was purged with nitrogen gas, agitation product was cooled and removed from the reactor.

EXAMPLE 15

To a 2-liter stainless steel pressure reactor were added 350.30 grams of the reaction product of example 12 and 0.88 grams of crushed potassium hydroxide. The reactor was purged with nitrogen gas, agitation started and heat applied by means of an electric mantle. When a temperature of 120° C. was reached the reactor was purged three times with nitrogen by pressurizing to 40 p.s.i.g. and then venting. When the temperature reached 150° C. the addition of 325.40 grams of propylene oxide was started. The addition required 53 minutes with a temperature range of 148° to 165° C. and a pressure range of 16 to 50 p.s.i.g. The reaction was continued for 5 minutes and the addition of 246.40 grams of ethylene oxide was then started. The addition of ethylene oxide required 15 minutes with a temperature range of 137° to 160° C. and a pressure range of 36 to 44 p.s.i.g. After 4 minutes additional reaction the addition of the second 325.40 grams of propylene oxide was started. The addition required 46 minutes with a temperature range of 134 to 163° C. and a pressure range of 20 to 50 p.s.i.g. When the reaction of the propylene oxide was complete the product was cooled and removed from the reactor.

EXAMPLE 16

To a 1-gallon stainless steel pressure reactor were added 837.3 grams of the reaction product of example 8 and 2.1 grams of crushed potassium hydroxide. The reactor was purged with nitrogen gas, agitation started and heat applied by means of an electric mantle. At a temperature of 105° C. the reactor was purged three times with nitrogen gas by pressurizing to 40 p.s.i.g. and then venting to atmospheric pressure. When the temperature reached 140° C. the addition of 783.6 grams of propylene oxide was started. The addition required 1 hour, 7 minutes with a temperature range of 140° to 165° C. and a pressure range of 4 to 40 p.s.i.g. The reaction was continued for 23 minutes and the addition of 593.4 grams of ethylene oxide was then started. The addition required 20 minutes with a temperature range of 153° to 163° C. and a pressure range of 8 to 30 p.s.i.g. After 12 minutes of additional reaction time the addition of the second 783.6 grams of propylene oxide was started. The addition required 48 minutes with a temperature range of 125° to 161° C. and a pressure range of 10 to 40 p.s.i.g. When the reaction of propylene oxide was complete the product was cooled and removed from the reactor.

EXAMPLE 17

To a 1-gallon stainless steel pressure reactor were added 837.3 grams of the reaction product of example 11 and 2.1 grams of crushed potassium hydroxide. The reactor was purged with nitrogen gas, agitation started and heat applied. At a temperature of 110° C. the reactor was purged three times with nitrogen gas by pressurizing to 40 p.s.i.g. and then venting to atmospheric pressure. When the temperature reached 145° C. the addition of 783.6 grams of propylene oxide was started. The addition of propylene oxide required 1 hour, 10 minutes with a temperature range of 144° to 173° C. and a pressure range of 12 to 33 p.s.i.g. After 7 minutes of additional reaction time the addition of 593.6 grams of ethylene oxide was started. The addition of ethylene oxide required 22 minutes with a temperature range of 157° to 162° C. and a pressure range of 12 to 28 p.s.i.g. The reaction was continued for 10 minutes and the addition of the second 783.6 grams of propylene oxide was started. The addition of the second part of propylene oxide required 1 hour, 7 minutes with a temperature range of 146° to 158° C. and a pressure range of 8 to 34.5 p.s.i.g. When the reaction of propylene oxide was complete the product was cooled and removed from the reactor.

Typical chemical and physical properties of the B products of the present invention are shown below in Table II.

TABLE II

| Surfactant, product of— | Mole ratio acid:EO:PO | Cloud point 1% in 5% NaCl soln., °C. | Refractive Index at 25° C. | Ross-Miles foam height in mm. Initial | Ross-Miles foam height in mm. 5 min. |
| --- | --- | --- | --- | --- | --- |
| Example: | | | | | |
| 13 | 1:20:20 | 34.5 | 1.4623 | | |
| 14 | 1:20:20 | 34.5 | 1.4628 | | |
| 15 | 1:40:40 | 35.0 | 1.4607 | 25 | 10 |
| 16 | 1:40:40 | 34.5 | 1.4607 | 23 | 10 |
| 17 | 1:40:40 | 35.5 | 1.4608 | 30 | 17 |

The results of sheeting and defoaming tests of rinse aid formulations comprising a mixture of Product A and Product B surfactants of the invention are summarized in Table III.

TABLE III

| Rinse aid formulation [1] | | Sheeting test on glass slide | | Defoamer test | | | Ross-Miles foam height | |
| --- | --- | --- | --- | --- | --- | --- | --- | --- |
| Product A of— | Product B of— | Minimum to begin sheeting (ml.) | Minimum for good sheeting (ml.) | Water only | Water and soil | Water, soil and surfactant | Initial mm. | 5 min., mm. |
| Example: | Example: | | | | | | | |
| 8 | 15 | 2.0 | 3.0 | 80 | 70 | 80 | 40 | 26 |
| 8 | 16 | 1.0 | 2.0 | 80 | 70 | 80 | 35 | 30 |
| 8 | 17 | 1.0 | 2.0 | 80 | 70 | 80 | 40 | 37 |
| 11 | 15 | 2.0 | 3.0 | 80 | 70 | 80 | 32 | 30 |
| 11 | 16 | 1.0 | 2.0 | 80 | 70 | 80 | 35 | 29 |
| 11 | 17 | 1.0 | 2.0 | 80 | 70 | 80 | 40 | 38 |

[1] The above formulations involved 12.5% Product A, 14.0% Product B, 73.5% water.

It will be apparent from the foregoing that the present invention provides novel nonionic surface active agents which in combination are particularly advantageous for use as rinse aids in mechanical dishwashing operations. For use as rinse aids the surfactants, A and B, of the invention are preferably employed in a ratio of from 1:1 to 1:10 parts of product A to B at concentrations of from 2 to 500 parts per million of the combination in aqueous solution.

Those modifications and equivalents which fall within the spirit of the invention are to be considered a part thereof.

What is claimed is:

1. A composition useful as a rinse aid in mechanical dishwashers which consists essentially of a mixture of product A and product B in a ratio of 1:1 to 10:1 parts wherein
Product A is a condensation product of from 10 to 30 moles of ethylene oxide with a distillate fraction of tall oil having an acid value of between about 100 and about 170 and a rosin acid content not above about 1 percent; and Product B is a block condensation product of ethylene oxide and propylene oxide with a distillate fraction of tall oil having an acid value of between about 100 and about 170 and a rosin acid content not above about 1 percent and having the formula:

$$Y-(C_2H_4O)_m-(C_3H_6O)_n(C_2H_4O_x-(C_3H_6O)_y-H$$

wherein Y represents the alkyl residue of acids present in tall oil heads and $m+x$ are integers which together range from 20 to 40 and $n+y$ are integers which together range from 20 to 40.

* * * * *

UNITED STATES PATENT OFFICE
CERTIFICATE OF CORRECTION

Patent No. 3,625,901   Dated December 7, 1971

Inventor(s) Larry M. Rue, Dale W. Groth, Alan W. Leipnitz, Thomas E. Brunelle and Samuel B. Crecelius It is certified that error appears in the above-identified patent and that said Letters Patent are hereby corrected as shown below:

Column 2, line 2, the formula should read as follows:

$$Y-(C_2H_4O)_m-(C_3H_6O)_n-(C_2H_4O)_x-(C_3H_6O)_y-H$$

Column 8, line 62, the formula should read as follows:

$$Y-(C_2H_4O)_m-(C_3H_6O)_n-(C_2H_4O)_x-(C_3H_6O)_y-H$$

Signed and sealed this 2nd day of May 1972.

(SEAL)
Attest:

EDWARD M. FLETCHER, JR.
Attesting Officer

ROBERT GOTTSCHALK
Commissioner of Patents